US010873216B2

(12) United States Patent
Shin et al.

(10) Patent No.: US 10,873,216 B2
(45) Date of Patent: Dec. 22, 2020

(54) WIRELESS POWER TRANSMITTER

(71) Applicant: WITS Co., Ltd., Yongin-si (KR)

(72) Inventors: Eun Young Shin, Suwon-si (KR); Hyo Young Kim, Suwon-si (KR); Seung Won Park, Suwon-si (KR); Byoung Woo Ryu, Suwon-si (KR); Young Seung Roh, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 254 days.

(21) Appl. No.: 16/021,612

(22) Filed: Jun. 28, 2018

(65) Prior Publication Data

US 2019/0173316 A1    Jun. 6, 2019

(30) Foreign Application Priority Data

Dec. 6, 2017  (KR) .......................... 10-2017-0166975

(51) Int. Cl.
| | |
|---|---|
| *H02J 50/12* | (2016.01) |
| *H02M 7/5387* | (2007.01) |
| *H02J 50/40* | (2016.01) |
| *H02M 3/335* | (2006.01) |
| *H02J 7/02* | (2016.01) |
| *H02J 50/80* | (2016.01) |

(52) U.S. Cl.
CPC .............. *H02J 50/12* (2016.02); *H02J 50/40* (2016.02); *H02M 7/5387* (2013.01); *H02J 7/025* (2013.01); *H02J 50/80* (2016.02); *H02M 3/33569* (2013.01)

(58) Field of Classification Search
CPC .. H02J 50/12; H02J 50/40; H02J 50/80; H02J 7/025; H02M 7/5387; H02M 3/33569
See application file for complete search history.

(56) References Cited

U.S. PATENT DOCUMENTS

2016/0241087 A1*  8/2016  Bae ..................... H02J 50/60
2018/0062430 A1*  3/2018  Matsumoto ....... H02M 3/33592

FOREIGN PATENT DOCUMENTS

| KR | 10-2008-0005687 A | 1/2008 |
| KR | 10-2013-0005571 A | 1/2013 |
| KR | 10-2016-0100755 A | 8/2016 |
| WO | WO 2016/133329 A1 | 8/2016 |

* cited by examiner

*Primary Examiner* — Carlos Amaya
(74) *Attorney, Agent, or Firm* — Harness, Dickey & Pierce, P.L.C.

(57) ABSTRACT

A wireless power transmitter includes: a first power transmitting unit including first switching elements forming a first bridge circuit, and configured to receive input DC voltage and transmit a first power by switching operations of the first switching elements; and a second power transmitting unit including second switching elements forming a second bridge circuit, and configured to receive the input DC voltage and transmit second power by switching operations of the second switching elements. The first power transmitting unit steps-up the input DC voltage according to a duty ratio of one or more of the first switching elements, and applies the stepped-up input DC voltage to the first bridge circuit. The second power transmitting unit steps-up or steps-down the input DC voltage according to a duty ratio of one or more of the second switching elements, and applies the stepped-up or stepped-down input DC voltage to the second bridge circuit.

17 Claims, 7 Drawing Sheets

WIRELESS POWER TRANSMITTER

CROSS-REFERENCE TO RELATED APPLICATIONS

This application claims benefit under 35 U.S.C. § 119(a) of Korean Patent Application No. 10-2017-0166975 filed on Dec. 6, 2017 in the Korean Intellectual Property Office, the entire disclosure of which is incorporated herein by reference for all purposes.

BACKGROUND

1. Field

The following description relates to a wireless power transmitter.

2. Description of Related Art

In accordance with the development of wireless technology, wireless functions range from the transmission of data to the transmission of power. In particular, a wireless charging technology capable of charging an electronic device with power, even in a non-contact state, has recently been developed.

For example, the wireless charging technology may be applied to various types of device such as smartphones, wearable watches, and other electronic devices. In addition, a user may also have various types of devices.

Accordingly, it is desirable to simultaneously charge various kinds of devices using a single wireless power transmitter. In addition, it is desirable to support various types of rechargeable power adapters in one wireless power transmitter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes: a first power transmitting unit including first switching elements forming a first bridge circuit, and configured to receive input direct current (DC) voltage and transmit a first power by switching operations of the first switching elements; and a second power transmitting unit including second switching elements forming a second bridge circuit, and configured to receive the input DC voltage and transmit a second power by switching operations of the second switching elements. The first power transmitting unit is configured to step-up the input DC voltage according to a duty ratio of at least one first switching element among the first switching elements, and apply the stepped-up input DC voltage to the first bridge circuit. The second power transmitting unit is configured to step-up or step-down the input DC voltage according to a duty ratio of at least one second switching element among the second switching elements, and apply the stepped-up or stepped-down input DC voltage to the second bridge circuit.

The wireless power transmitter may further include a controller configured to output first power transmitting control signals controlling the first switching elements and second power transmitting control signals controlling the second switching elements.

The controller may be implemented in a single integrated circuit.

The input DC voltage may be either one of a first voltage and a second voltage greater than the first voltage.

The controller may be configured to set a duty ratio of at least one of the second power transmitting control signals to a first duty ratio greater than a reference duty ratio, in response to the input DC voltage being the first voltage.

The controller may be configured to set a duty ratio of at least one of the second power transmitting control signals to a second duty ratio lower than a reference duty ratio, in response to the input DC voltage being the second voltage.

The first power transmitting control signals and the second power transmitting control signals may have a same frequency.

The controller may be configured to determine duties and frequencies of the first power transmitting control signals and frequencies of the second power transmitting control signals in response to a signal received from a first wireless power receiver receiving the first power from the first power transmitting unit, and determine duties of the second power transmitting control signals in response to a signal received from a second wireless power receiver receiving the second power from the second power transmitting unit.

The first bridge circuit may be a full-bridge circuit, and the second bridge circuit may be a half-bridge circuit.

The first power transmitting unit may include an inductor connected between a terminal to which the input DC voltage is applied and a first node, a capacitor connected between a second node and a ground, a first switching element among the first switching elements, connected between the first node and the second node, a second switching element among the first switching elements, connected between the first node and the ground, a third switching element among the first switching elements, connected between the second node and a third node, and a fourth switching element among the first switching elements, connected between the third node and the ground.

The second power transmitting unit may include an inductor connected between a terminal to which the input DC is applied and a first node, a first capacitor connected between a second node and the first node, a second capacitor connected between a third node and a ground, a first switching element among the second switching elements, connected between the second node and the third node, and a second switching element among the second switching elements, connected between the first node and the ground.

In another general aspect, a wireless power transmitter includes: a first resonance circuit; and a step-up/step-down inverter including first switching elements forming a first bridge circuit, and configured to receive input direct current (DC) voltage and transmit a first power through the first resonance circuit by switching operations of the first switching elements. The step-up/step-down inverter is configured to step-down the input DC voltage according to a duty ratio of at least one first switching element among the first switching elements and apply the stepped-down input DC voltage to the first bridge circuit, in response to the input DC voltage being a first voltage.

The step-up/step-down inverter may be configured to step-up the input DC voltage and apply the stepped-up input DC voltage to the first bridge circuit, in response to the input DC voltage being a second voltage lower than the first voltage.

The wireless power transmitter may further include a controller configured to output a first power transmitting control signal controlling the switching elements.

The controller may be configured to set a duty ratio of the first power transmitting control signal to a first duty ratio lower than a reference duty ratio, in response to the input DC voltage being the first voltage.

The controller may be configured to set a duty ratio of the first power transmitting control signal to a second duty ratio greater than a reference duty ratio, in response to the input DC voltage being the second voltage.

The first bridge circuit may be a half-bridge circuit.

The step-up/step-down inverter may include an inductor connected between a terminal to which the input DC voltage is applied and a first node, a first capacitor connected between the first node and a second node, a first switching element, among the switching elements, connected between the second node and a third node, a second switching element, among the switching elements, connected between the first node and a ground, and a second capacitor connected between the third node and the ground.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
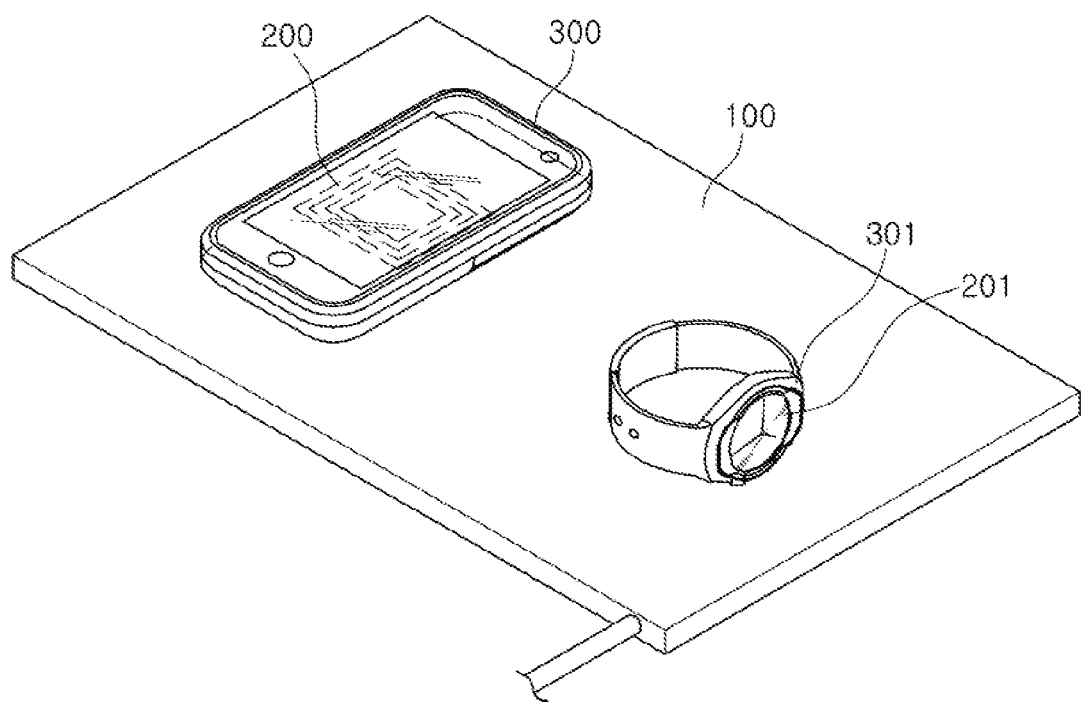
FIG. 1 is a diagram illustrating a wireless power transmitter, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is a diagram illustrating a wireless power transmitter 100, according to an embodiment.

Referring to FIG. 1, the wireless power transmitter 100 may simultaneously charge different kinds of devices, such as a smartphone 300 including a first wireless power receiver 200 and a wearable device 301 including a second wireless power receiver 201. The wireless power transmitter 100 may provide power to the first wireless power receiver 200 and the second wireless power receiver 201. Although FIG. 1 illustrates an example in which the first wireless power receiver 200 and the second wireless power receiver 201 are simultaneously charged, only one of the first wireless power receiver 200 and the second wireless power receiver 201 may be charged in some cases.

The wireless power transmitter 100 supplies power to the first wireless power receiver 200 and the second wireless power receiver 201 using different resonance circuits based on one input power. Since a resonance setting for the first wireless power receiver 200 and a resonance setting for the second wireless power receiver 201 may be different, the wireless power transmitter 100 may individually provide a step-up function or a step-up/step-down function, and an inverting function to each resonance circuit among a plurality of resonance circuits.

To this end, the wireless power transmitter 100 may perform the step-up function or the step-up/step-down function, and the inverting function using one unified circuit. In this disclosure, such a unified circuit is referred to as a 'step-up inverter' or a 'step-up/step-down inverter'.

Figure 2:
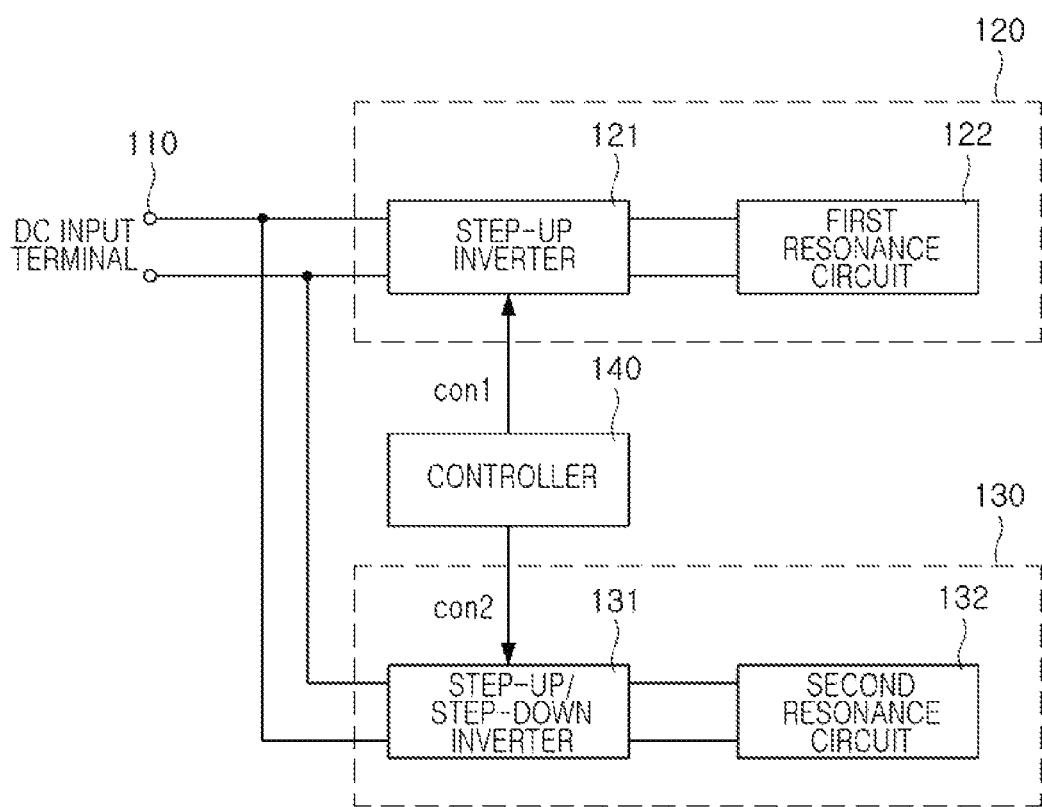
FIG. 2 is a block diagram illustrating the wireless power transmitter of FIG. 1, according to an embodiment.

FIG. 2 is a block diagram illustrating the wireless power transmitter 100, according to an embodiment.

Referring to FIG. 2, the wireless power transmitter 100 may include an input terminal 110 receiving an input direct current (DC) voltage, a first power transmitting unit 120, a second power transmitting unit 130, and a controller 140.

Input power may be supplied through the input terminal 110. The input power may be DC power. Therefore, the input DC voltage may be formed across the input terminal 110.

The input DC voltage may be provided by a power adapter (not shown) providing the DC voltage to the wireless power transmitter 100. Alternatively, according to an embodiment, the wireless power transmitter 100 may further include a power supply (not shown) receiving alternating current (AC) power and supplying the input power, and the input DC voltage may be provided by such a power supply.

The input DC voltage supplied through the input terminal 110 may have a voltage value which may be varied.

The input DC voltage may be any one of a first voltage and a second voltage greater than the first voltage. As an example, the input DC voltage may be 5V or 9V.

For example, magnitude of the input DC voltage provided by the power adapter may be changed depending on a type of the power adapter, but the wireless power transmitter 100 may stably transmit the power by performing a step-up function or a step-down function adapted to a change even in an environment in which the input DC voltage is changed as described above.

The first power transmitting unit 120 may include first switching elements forming a first bridge circuit. The first switching elements forming the first bridge circuit may form a step-up inverter 121.

The first power transmitting unit 120 may receive the input DC voltage and transmit first power to the first power receiver 200 by switching operations of the first switching elements.

The first power transmitting unit 120 may step-up the input DC voltage by an amount equal to a duty ratio of at least one first switching element among the first switching elements and may apply the stepped-up input DC voltage to the first bridge circuit. That is, the first power transmitting unit 120 may include a step-up inverter 121 configured to perform a step-up and a conversion into AC power using one circuit.

The step-up and the conversion into AC power may be performed by a switching operation of the step-up inverter 121. Accordingly, the first power may be wirelessly transmitted to the first wireless power receiver 200 through the first resonance circuit 122.

The second power transmitting unit 130 may include second switching elements forming a second bridge circuit. The second switching elements forming the second bridge circuit may form a step-up/step-down inverter 131.

The second power transmitting unit 130 may receive the input DC voltage and transmit second power to the second power receiver 201 by switching operations of the second switching elements.

The second power transmitting unit 130 may step-up or step-down the input DC voltage by a duty ratio of at least one second switching element among the second switching elements and may apply the stepped-up or stepped-down DC voltage to the second bridge circuit. That is, the second power transmitting unit 130 may include a step-up/step-down inverter 131 configured to perform a step-up or step-down and a conversion into AC power using one circuit.

The step-up or step-down and the conversion into AC power may be performed by a switching operation of the step-up/step-down inverter 131. Accordingly, the second power may be wirelessly transmitted to the second wireless power receiver 201 through the second resonance circuit 132.

The first power transmitted by the first power transmitting unit 120 may be greater than the second power transmitted by the second power transmitted 130. To this end, the first power transmitting unit 120 may include a full-bridge inverter, and the second power transmitting unit 130 may include a half-bridge inverter. As an example, the first wireless power receiver 200 may be a mobile terminal such as a smartphone or the like requiring a relatively large amount of power, and the second wireless power receiver 201 may be a wearable device requiring a relatively small amount of power.

The controller 140 may control operations of the step-up inverter 121 and the step-up/step-down inverter 131. For example, as shown in FIG. 2, the controller 140 may output a first power transmitting control signal con1 controlling the first switching elements and a second power transmitting control signal con2 controlling the second switching elements.

The first power transmitting control signal con1 may include a plurality of control signals for controlling switching elements of an inverter of the first power transmitting unit 120, and the second power transmitting control signal con2 may include a plurality of control signals for controlling switching elements of an inverter of the second power transmitting unit 130.

The controller 140 may control a wireless charging operation performed by the first power transmitting unit 120 by adjusting a frequency, a duty, and/or a timing (or a phase difference) of each of the control signals included in the first power transmitting control signal con1. For example, the controller 140 may determine a frequency, a duty, and the like of each of the control signals included in the first power transmitting control signal con1, in response to a signal received from the first wireless power receiver 200 (FIG. 1) and may output the first power transmitting control signal con1 according to a result of the determination.

In addition, the controller 140 may control a wireless charging operation performed by the second power transmitting unit 130 by adjusting a frequency and/or a duty of each of the control signals included in the second power transmitting control signal con2. In this case, frequencies of the control signals included in the second power transmitting control signal con2 may be determined by frequencies of the control signals included in the first power transmitting control signal. For example, the controller 140 may determine the frequencies of the control signals included in the second power transmitting control signal con2 based on the frequency of the first power transmitting control signal con1, may determine duties of the control signals included in the second power transmitting control signal con2, in response to a signal received from the second wireless power receiver 201 (FIG. 1), and may output the second power transmitting control signal con2 according to a result of the determination. That is, the frequencies of the control signals included in the second power transmitting control signal con2 may be determined according to the signal received from the first wireless power receiver 200 (FIG. 1).

As described above, the magnitude of the input DC voltage may be changed. For example, the input DC voltage may be either one of a first voltage and a second voltage greater than the first voltage.

Correspondingly, the controller 140 may control operations of the step-up inverter 121 and the step-up/step-down inverter 131.

For example, if the input DC voltage is the first voltage, the controller 140 may output the first power transmitting control signal con1 so that the duty ratio of the first power transmitting control signal con1 is set to a first reference duty ratio. For example, if the input DC voltage is 5V, the controller 140 may set a reference duty ratio to 50% and may output the first power transmitting control signal con1 so that the input DC voltage is stepped up to 10V.

If the input DC voltage is the second voltage, the controller 140 may output the first power transmitting control signal con1 so that the duty ratio of the first power transmitting control signal con1 is set to a duty ratio lower than the first reference duty ratio. For example, if the input DC voltage is 9V, the controller 140 may set the duty ratio to a duty ratio lower than 50% and may output the first power transmitting control signal con1 so that the input DC voltage is stepped up to 10V.

As another example, if the input DC voltage is the first voltage, the controller 140 may output the second power transmitting control signal con2 so that the duty ratio of the second power transmitting control signal is set to a first duty ratio greater than a second reference duty ratio. As described above, when the duty ratio of the second power transmitting control signal con2 is set to the first duty ratio greater than the second reference duty ratio, the step-up/step-down inverter 131 may perform a step-up and conversion into AC operation, that is, operate as a step-up inverter.

As another example, if the input DC voltage is the second voltage, the controller 140 may output the second power transmitting control signal con2 so that the duty ratio of the second power transmitting control signal con2 is set to a second duty ratio lower than the second reference duty ratio. As described above, when the duty ratio of the second power transmitting control signal con2 is set to the second duty ratio lower than the second reference duty ratio, the step-up/step-down inverter 131 may perform a step-down and conversion into AC operation, that is, operate as a step-down inverter. In this example, the second reference duty ratio may be 50%.

The controller 140 may be implemented as a single integrated circuit. The first power transmitting unit 120 and the second power transmitting unit 130 are controlled by one controller 140 implemented as a single integrated circuit, such that costs for manufacturing the wireless power transmitter may be reduced.

In addition, the controller 140 may include at least one processing unit or processor. According to an embodiment, the controller 140 may further include a memory. The processing unit or processor may include, for example, a central processing unit (CPU), a graphic processing unit (GPU), a microprocessor, an application specific integrated circuit (ASIC), field programmable gate arrays (FPGA), and the like, and may have multiple cores. The memory may be a volatile memory (e.g., a random access memory (RAM), or the like), a non-volatile memory (e.g., a read only memory (ROM), a flash memory, or the like), or a combination of a volatile memory and a non-volatile memory. The memory may store a program created to perform a wireless power transmission method according to an embodiment in this disclosure.

According to an embodiment, the controller 140 may include a gate driver. Alternatively, according to an embodiment, the wireless power transmitter 100 may separately include a gate driver for driving switches included in the first power transmitting unit 120 and/or the second power transmitting unit 130 according to the control signal con1/con2 provided from the controller 140.

Figure 3:
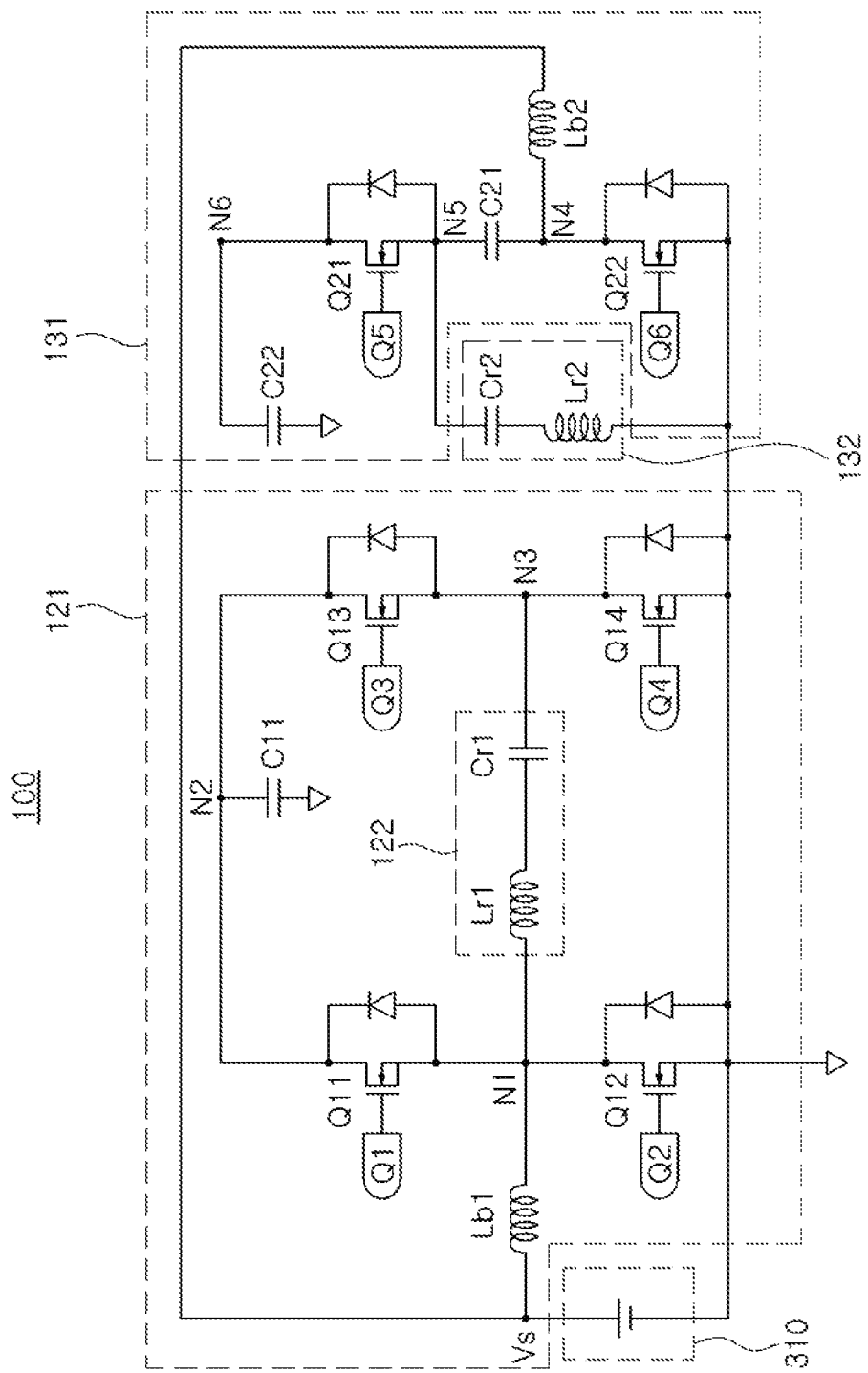
FIG. 3 is a schematic circuit diagram illustrating the wireless power transmitter of FIG. 1, according an embodiment.

FIG. 3 is a schematic circuit diagram illustrating the wireless power transmitter 100, according to an embodiment. Hereinafter, an operation of the wireless power transmitter 100 will be described with reference to FIG. 3.

Referring to FIG. 3, the wireless power transmitter 100 may include the step-up inverter 121, the first resonance circuit 122, the step-up/step-down inverter 131, and the second resonance circuit 132. The controller 140 (FIG. 2) is omitted in FIG. 3.

An input direct current (DC) voltage Vs may be formed through a power supply 310. The input DC voltage may be any one of a first voltage and a second voltage greater than the first voltage, as described above.

The step-up inverter 121 may include a first boost inductor Lb1 connected between a node to which the input DC voltage Vs is applied and a first node N1, a first capacitor C11 connected between a second node N2 and a ground, a first switching element Q11 connected between the first node N1 and the second node N2, and operating in response to a first control signal Q1, a second switching element Q12 connected between the first node N1 and the ground and operating in response to a second control signal Q2, a third switching element Q13 connected between the second node N2 and a third node N3, and operating in response to a third control signal Q3, and a fourth switching element Q14 connected between the third node N3 and the ground, and operating in response to a fourth control signal Q4.

The first resonance circuit 122 may include a first resonance capacitor Cr1 and a first resonance inductor Lr1 which are connected in series with each other between the first node N1 and the third node N3.

The step-up inverter 121, that is, the first boost inductor Lb1, the first capacitor C11, the first switching element Q11, the second switching element Q12, the third switching element Q13, and the fourth switching element Q14 may convert the input DC voltage Vs into first AC power and output the AC power.

In the step-up inverter 121, the first boost inductor Lb1, the first capacitor C11, the first switching element Q11, and the second switching element Q12 may operate as a boost converter that steps-up the input DC voltage Vs to a first inverter input voltage (i.e., a voltage of the second node N2).

In addition, the first switching element Q11, the second switching element Q12, the third switching element Q13, and the fourth switching element Q14 may operate as a full-bridge inverter that converts the first inverter input voltage into the first AC power.

As such, the step-up inverter 121 may have a form in which the boost converter and the full-bridge inverter are coupled to each other. That is, a step-up function and a conversion into AC may be performed by switching operations of the first through fourth switching elements Q11 through Q14 included in the step-up inverter 121. That is, the step-up function and the conversion into AC may be performed by one switching control.

The first resonance capacitor Cr1 and the first resonance inductor Lr1 included in the first resonance circuit 122 may be supplied with the first AC power, and may be magnetically coupled to a reception resonance circuit of the wireless power receiver 100' based on the first AC power to wirelessly transmit the first AC power.

A time at which the first AC power is applied to a first resonating unit may be determined by on/off timings of the switching elements Q11, Q12, Q13, and Q14. That is, in a case in which both the first switching element Q11 and the fourth switching element Q14 are in an on-state, or both the second switching element Q12 and the third switching element Q13 are in the on-state, the first AC power may be applied to the first resonating unit. An inverter duty determining a time at which the first AC power is applied to the first resonating unit may be defined as a ratio of a sum of a first time in which both the first switching element Q11 and the fourth switching element Q14 are in the on-state and a second time in which both the second switching element Q12 and the third switching element Q13 are in the on-state to operation periods of the switching elements Q11, Q12, Q1, and Q15.

In a case in which a phase control is not performed, a first AC power (Vinv1(t)), that is, a voltage between the first node N1 and the third node N3 may be determined as in Equation 1.

$$Vint1(t)=4(Vs/(1-D))\sin(\omega t/\pi) \quad \text{[Equation 1]}$$

Here, Vs is voltage magnitude of the input DC voltage received from the power supply 310, D is an operation duty and is a duty of a first control signal, and ω is a frequency of each of control signals Q1, Q2, Q3, and Q4.

The step-up/step-down inverter 131 may include a second boost inductor Lb2 connected between a node to which the input DC voltage Vs is applied and the fourth node N4, a second capacitor C21 connected between a fifth node N5 and the fourth node N4, a third capacitor C22 connected between a sixth node N6 and the ground, a fifth switching element Q21 connected between the fifth node N5 and the sixth node N6, and operating in response to a fifth control signal Q5, and a sixth switching element Q22 connected between the fourth node N4 and the ground, and operating in response to a sixth control signal Q6.

The second resonance circuit 132 may include a second resonance capacitor Cr2 and a second resonance inductor Lr2 which are connected in series with each other between the fifth node N5 and the ground.

The second boost inductor Lb2, the second capacitor C21, the third capacitor C22, the fifth switching element Q21, and the sixth switching element Q22 of the step-up/step-down inverter 131 may convert the input DC voltage Vs into second AC power and output it.

In the step-up/step-down inverter 131, the second boost inductor Lb2, the second capacitor C21, the third capacitor C22, the fifth switching element Q21, and the sixth switching element Q22 may operate as a step-up/down converter that steps-up or steps-down the input DC voltage Vs to a second inverter input voltage, and the fifth switching element Q21 and the sixth switching element Q22 may operate a half-bridge inverter that converts the second inverter input voltage into the second AC power.

As described above, the step-up/step-down inverter 131 may have a form in which the step-up/down converter and the full-bridge inverter are coupled to each other. That is, a step-up function or a step-down function and a conversion into AC power may be performed by switching operations of the fifth switching element Q21 and the sixth switching element Q22 included in the step-up/step-down inverter 131. That is, the step-up function or the step-down function and the conversion into AC power may be performed by one switching control.

A magnitude of a second inverter input voltage V_N6 may be determined by Equation 2.

$$V\_N6=VsD/(1-D) \quad \text{[Equation 2]}$$

In Equation 2 above, Vs is magnitude of the input DC voltage received from the power supply 310, and D is an operation duty and is an ON-duty of a sixth control signal Q6.

The first inverter input voltage (i.e., a voltage of the second node N2) and the second inverter input voltage (i.e., a voltage of the sixth node N6) do not affect each other. Thereby, each of the first power transmitting unit 120 (FIG. 2) and the second power transmitting unit 130 (FIG. 2) may be separately controlled. Therefore, both the first power transmitting unit 120 (FIG. 2) and the second power transmitting unit 130 (FIG. 2) may wirelessly transmit power at optimum efficiency.

Figure 4:
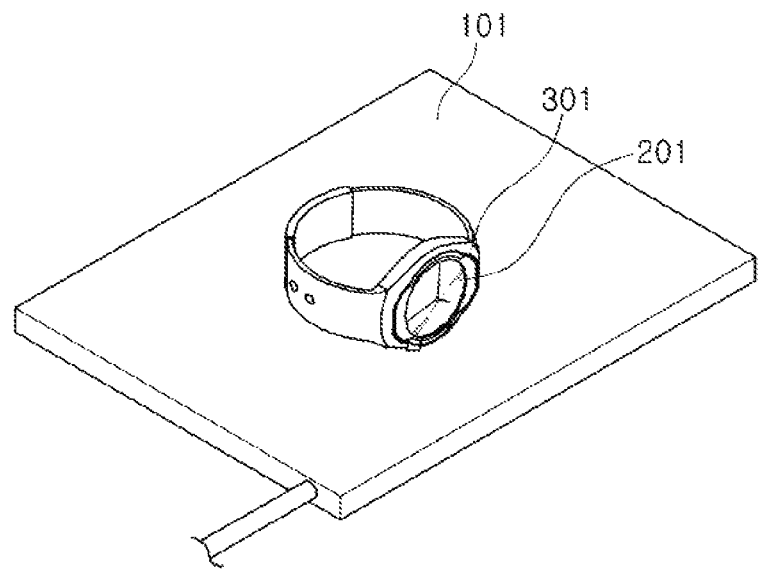
FIG. 4 is a diagram illustrating a wireless power transmitter, according to another embodiment.

FIG. 4 is a diagram illustrating a wireless power transmitter 101, according to another embodiment.

Referring to FIG. 4, the wireless power transmitter 101 may charge a wearable device 301.

The wireless power transmitter 101 may perform the step-up or step-down function and the inverting function using one unified circuit. That is, the wireless power transmitter 101 may include a step-up/step-down inverter to perform a conversion into AC operation together with the step-up or step-down function according to magnitude of the input DC voltage.

Hereinafter, the wireless power transmitter 101 will be described in more detail with reference to FIGS. 5 and 6. However, contents of FIGS. 5 and 6 corresponding to, or easily understandable from the description with reference to FIGS. 1 through 3 will not be hereinafter described.

Figure 5:
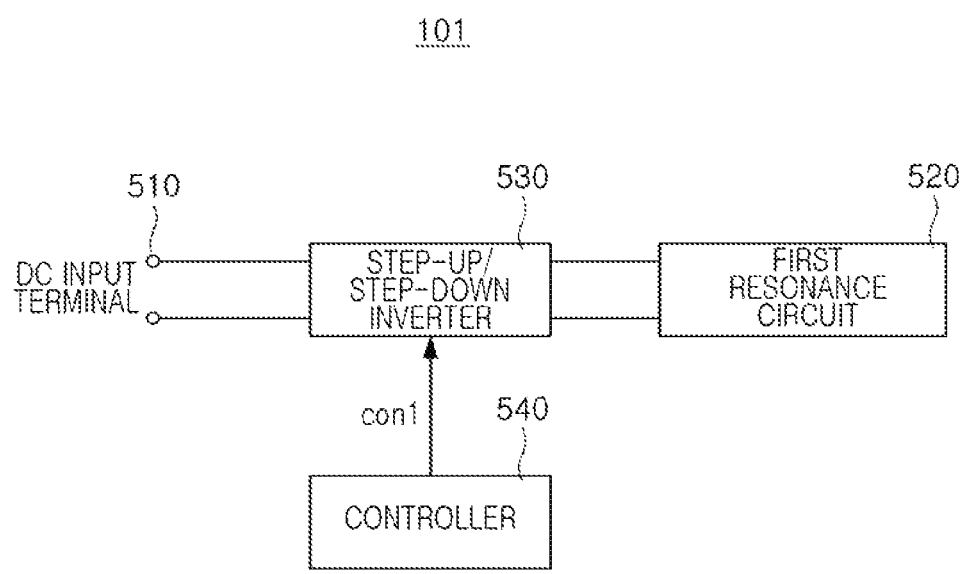
FIG. 5 is a block diagram illustrating the wireless power transmitter of FIG. 4, according to another embodiment.

FIG. 5 is a block diagram illustrating the wireless power transmitter 101, according to an embodiment.

Referring to FIG. 5, the wireless power transmitter 101 may include an input terminal 510 providing an input direct current (DC) voltage, a first resonance circuit 520, a step-up/step-down inverter 530, and a controller 540.

The step-up/step-down inverter 530 may include first switching elements forming a first bridge circuit. The step-up/step-down inverter 530 may transmit first power through the first resonance circuit by switching operations of the first switching elements. The step-up/step-down inverter 530 may step-up or step-down the input DC voltage by a duty ratio of at least one first switching element among the first switching elements, and may apply the stepped-up or stepped-down input DC voltage to the first bridge circuit.

The controller 540 may provide a first power transmitting control signal con1 to the step-up/step-down inverter 530 to control an operation of the step-up/step-down inverter 530.

As described above, magnitude of the input DC voltage may be changed. For example, the input DC voltage may be a first voltage or a second voltage greater than the first voltage. Correspondingly, the controller 540 may control an operation of the step-up/step-down inverter 530 as described above.

As an example, if the input DC voltage is the first voltage, the controller 540 may output the first power transmitting control signal con1 so that the duty ratio of the first power transmitting control signal is set to a first duty ratio greater than a reference duty ratio. As described above, when the duty ratio of the first power transmitting control signal con1 is set to the first duty ratio greater than the reference duty ratio, the step-up/step-down inverter 530 may perform a step-up operation and a conversion into AC operation, that is, operate as a step-up inverter.

As another example, if the input DC voltage is the second voltage, the controller 540 may output the first power transmitting control signal con1 so that the duty ratio of the first power transmitting control signal is set to a second duty ratio lower than the reference duty ratio. As described above, when the duty ratio of the first power transmitting control signal is set to the second duty ratio lower than the reference duty ratio, the step-up/step-down inverter 530 may perform a step-down operation and a conversion into AC operation, that is, operate as a step-down inverter.

Figure 6:
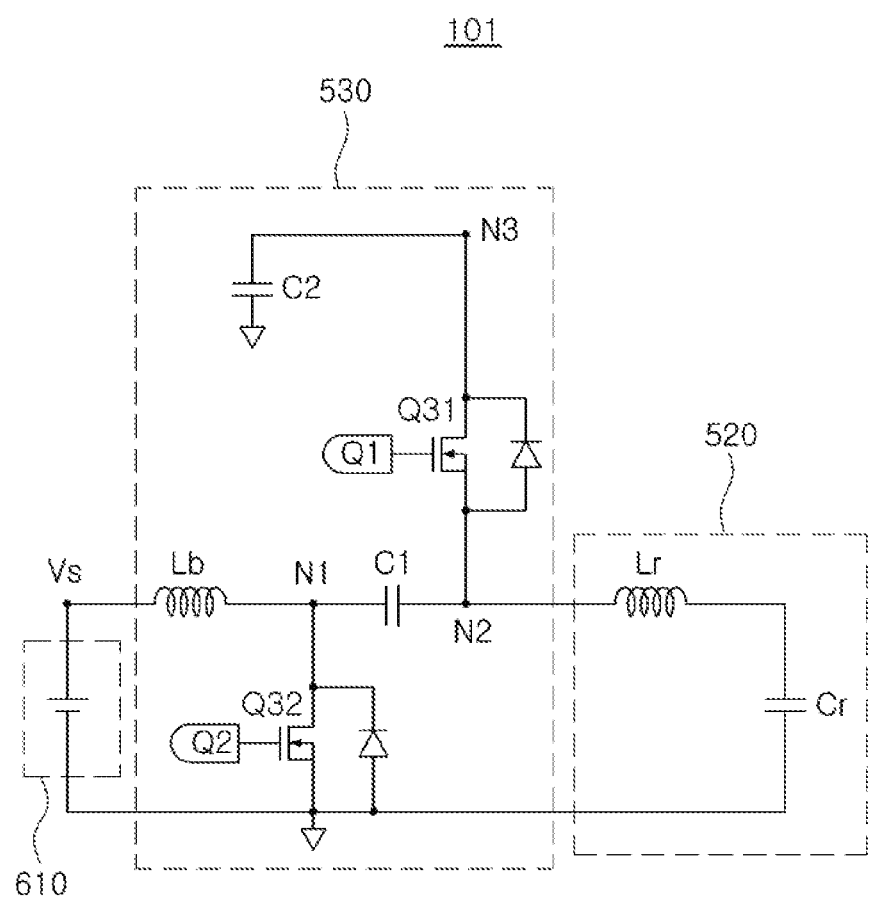
FIG. 6 is a schematic circuit diagram illustrating the wireless power transmitter of FIG. 4, according to an embodiment.

FIG. 6 is a schematic circuit diagram of the wireless power transmitter 101, according to an embodiment.

Referring to FIG. 6, the step-up/step-down inverter 530 may include a boost inductor Lb connected between a node to which the input DC voltage Vs is applied and a first node N1, a first capacitor C1 connected between the first node N1 and a second node N2, a second capacitor C2 connected between a third node N3 and a ground, a first switching element Q31 connected between the second node N2 and the third node N3, and operating in response to a first control signal Q1, and a second switching element Q32 connected between the first node N1 and the ground, and operating in response to a second control signal Q2.

The first resonance circuit 520 may include a resonance capacitor Cr and a resonance inductor Lr which are connected in series with each other between the second node N2 and the ground.

The boost inductor Lb, the first capacitor C1, the second capacitor C2, the first switching element Q31, and the second switching element Q32 of the step-up/step-down inverter 530 may convert the input DC voltage Vs into AC power and output the AC power.

In addition, in the step-up/step-down inverter 530, the boost inductor Lb, the first capacitor C1, the second capacitor C2, the first switching element Q31, and the second switching element Q32 may operate as a step-up/down converter that steps-up or steps-down the input DC voltage Vs to an inverter input voltage, and the first switching element Q31 and the second switching element Q32 may operate a half-bridge inverter that converts the inverter input voltage into the AC power, as described with reference to FIG. 3.

As described above, the step-up/step-down inverter 530 may have a form in which the step-up/down converter and the half-bridge inverter are coupled to each other. That is, a step-up function or a step-down function and a conversion into AC power may be performed by switching operations of the first switching element Q31 and the second switching element Q32 included in the step-up/step-down inverter 530. That is, the step-up function or the step-down function and the conversion into AC power may be performed by one switching control.

Figure 7:
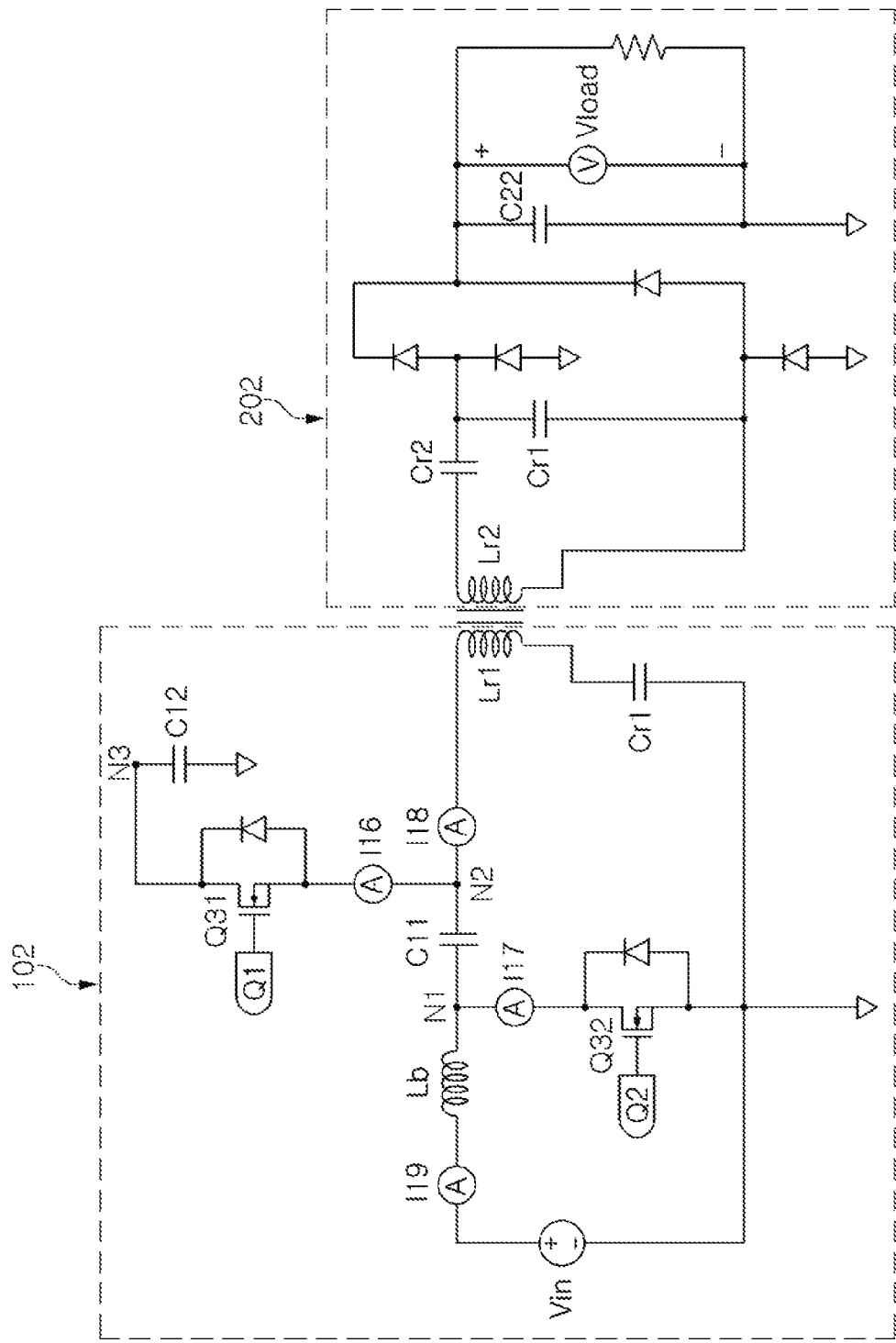
FIG. 7 is a schematic circuit diagram of a wireless power transmitter, according to another embodiment, and a wireless power receiver magnetically coupled to the wireless power transmitter.
Figure 8:
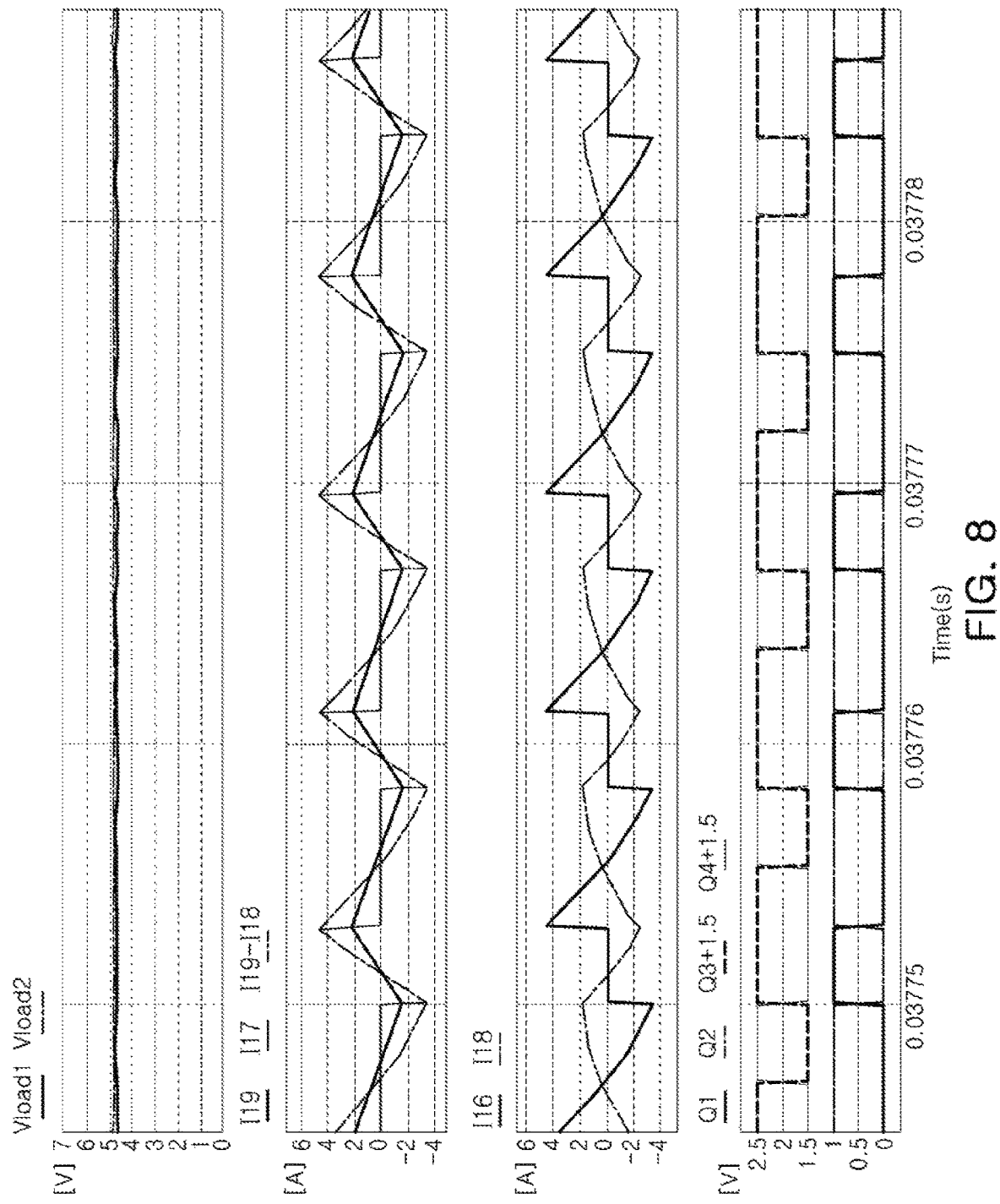
FIG. 8 is a graph illustrating schematic examples of the respective signals in the circuit diagram illustrated in FIG. 7.

FIG. 7 is a schematic circuit diagram of a wireless power transmitter 102, according to another embodiment, and a wireless power receiver 202 magnetically coupled to the wireless power transmitter 102. FIG. 8 is a graph illustrating schematic examples of respective signals in the circuit diagram illustrated in FIG. 7.

In examples illustrated in FIGS. 7 and 8, an input DC voltage Vin is set to two conditions of 5V and 9V, and an output voltage of the wireless power receiver 102 is based on 5V, 0.5 A.

Referring to FIG. 7, the wireless power transmitter 102 may include a step-up/step-down inverter formed by the boost inductor Lb connected between a node to which the input DC voltage Vin is applied and a first node N1, a first capacitor C11 connected between the first node N1 and a second node N2, a second capacitor C12 connected between a third node N3 and a ground, the first switching element Q31 connected between the second node N2 and the third node N3, and operating in response to the first control signal Q1, and the second switching element Q32 connected between the first node N1 and the ground, and operating in response to the second control signal Q2.

The wireless power transmitter 102 may further include a resonance circuit formed by a capacitor Cr1 and a resonance inductor Lr1 which are connected in series with each other between the second node N2 and the ground.

As shown in FIG. 7, the wireless power receiver 202 includes a resonance circuit formed by a resonance inductor Lr2 and resonance capacitors Cr1 and Cr2, and a capacitor C22 connected in parallel with the load.

In FIG. 8, Vload1 is output voltage of the wireless power receiver 202 in a case in which the input DC voltage of the wireless power transmitter 102 is 5V, and Vload2 is output voltage of the wireless power receiver 202 in a case in which the input DC voltage of the wireless power transmitter 102 is 9V.

As illustrated in FIG. 8, when an input voltage is changed between 5V and 9V, it can be seen that an output voltage of the wireless power receiver 102 is maintained to approximately 5V by changing a duty ratio of the wireless power transmitter 102 to correspond to the change in the input voltage. In the illustrated example, the duty ratio is 64% when the input voltage is 5V, and the duty ratio is 35% when the input voltage is 9V.

In addition, since the range of the duty ratio is adjusted between 30% and 70%, a control range of the duty ratio may be adjusted in a predetermined or specified range, thereby providing ease of control.

As set forth above, according to an embodiment disclosed herein, a wireless power transmitter may satisfy the requirements of low cost and miniaturization while charging the different kinds of devices. Additionally, a wireless power transmitter according to an embodiment disclosed herein may stably operate even in various input voltage environments.

The controller 140 of FIG. 2 and the controller 540 of FIG. 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
a first power transmitting unit comprising first switching elements forming a first bridge circuit, and configured to receive input direct current (DC) voltage and transmit a first power by switching operations of the first switching elements; and
a second power transmitting unit comprising second switching elements forming a second bridge circuit, and configured to receive the input DC voltage and transmit a second power by switching operations of the second switching elements,
wherein the first power transmitting unit is configured to step-up the input DC voltage according to a duty ratio of at least one first switching element among the first switching elements, and apply the stepped-up input DC voltage to the first bridge circuit, and wherein the second power transmitting unit is configured to step-up or step-down the input DC voltage according to a duty ratio of at least one second switching element among the second switching elements, and apply the stepped-up or stepped-down input DC voltage to the second bridge circuit.

2. The wireless power transmitter of claim 1, further comprising:
a controller configured to output first power transmitting control signals controlling the first switching elements and second power transmitting control signals controlling the second switching elements.

3. The wireless power transmitter of claim 2, wherein the controller is implemented in a single integrated circuit.

4. The wireless power transmitter of claim 2, wherein the input DC voltage is either one of a first voltage and a second voltage greater than the first voltage.

5. The wireless power transmitter of claim 4, wherein the controller is configured to set a duty ratio of at least one of the second power transmitting control signals to a first duty ratio greater than a reference duty ratio, in response to the input DC voltage being the first voltage.

6. The wireless power transmitter of claim 4, wherein the controller is configured to set a duty ratio of at least one of the second power transmitting control signals to a second duty ratio lower than a reference duty ratio, in response to the input DC voltage being the second voltage.

7. The wireless power transmitter of claim 2, wherein the first power transmitting control signals and the second power transmitting control signals have a same frequency.

8. The wireless power transmitter of claim 7, wherein the controller is configured to determine duties and frequencies of the first power transmitting control signals and frequencies of the second power transmitting control signals in response to a signal received from a first wireless power receiver receiving the first power from the first power transmitting unit, and determine duties of the second power transmitting control signals in response to a signal received from a second wireless power receiver receiving the second power from the second power transmitting unit.

9. The wireless power transmitter of claim 1, wherein the first bridge circuit is a full-bridge circuit, and the second bridge circuit is a half-bridge circuit.

10. The wireless power transmitter of claim 1, wherein the first power transmitting unit comprises,
an inductor connected between a terminal to which the input DC voltage is applied and a first node,
a capacitor connected between a second node and a ground,
a first switching element among the first switching elements, connected between the first node and the second node,
a second switching element among the first switching elements, connected between the first node and the ground,
a third switching element among the first switching elements, connected between the second node and a third node, and
a fourth switching element among the first switching elements, connected between the third node and the ground.

11. The wireless power transmitter of claim 1, wherein the second power transmitting unit comprises,
an inductor connected between a terminal to which the input DC is applied and a first node,
a first capacitor connected between a second node and the first node,
a second capacitor connected between a third node and a ground,
a first switching element among the second switching elements, connected between the second node and the third node, and
a second switching element among the second switching elements, connected between the first node and the ground.

12. A wireless power transmitter, comprising:
a first resonance circuit; and
a step-up/step-down inverter comprising switching elements forming a first bridge circuit, and configured to receive input direct current (DC) voltage and transmit a first power through the first resonance circuit by switching operations of the switching elements,
wherein the step-up/step-down inverter is configured to step-down the input DC voltage according to a duty ratio of at least one switching element among the switching elements and apply the stepped-down input DC voltage to the first bridge circuit, in response to the input DC voltage being a first voltage, and
wherein the step-up/step-down inverter comprises,
an inductor connected between a terminal to which the input DC voltage is applied and a first node,
a first capacitor connected between the first node and a second node,
a first switching element, among the switching elements, connected between the second node and a third node,
a second switching element, among the switching elements, connected between the first node and a ground, and
a second capacitor connected between the third node and the ground.

13. The wireless power transmitter of claim 12, wherein the step-up/step-down inverter is configured to step-up the input DC voltage and apply the stepped-up input DC voltage to the first bridge circuit, in response to the input DC voltage being a second voltage lower than the first voltage.

14. The wireless power transmitter of claim 13, further comprising:
a controller configured to output a first power transmitting control signal controlling the switching elements.

15. The wireless power transmitter of claim 14, wherein the controller is configured to set a duty ratio of the first power transmitting control signal to a first duty ratio lower than a reference duty ratio, in response to the input DC voltage being the first voltage.

16. The wireless power transmitter of claim 14, wherein the controller is configured to set a duty ratio of the first power transmitting control signal to a second duty ratio greater than a reference duty ratio, in response to the input DC voltage being the second voltage.

17. The wireless power transmitter of claim 12, wherein the first bridge circuit is a half-bridge circuit.

* * * * *